United States Patent Office 2,817,415
Patented Dec. 24, 1957

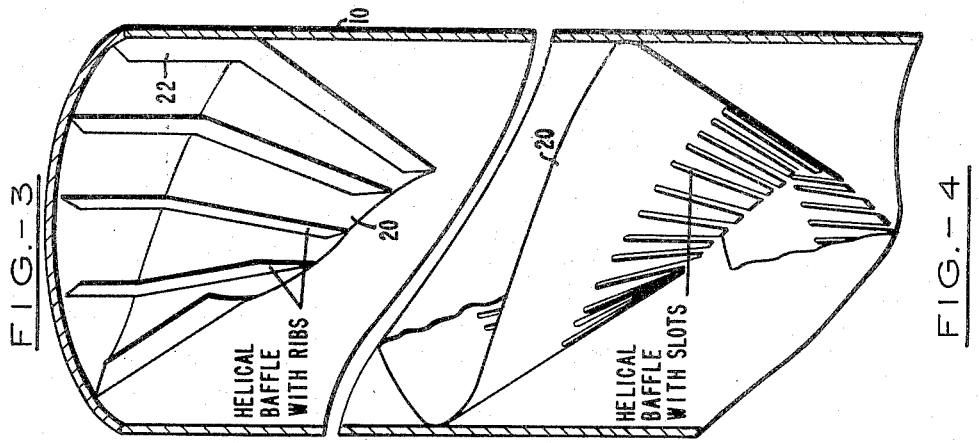
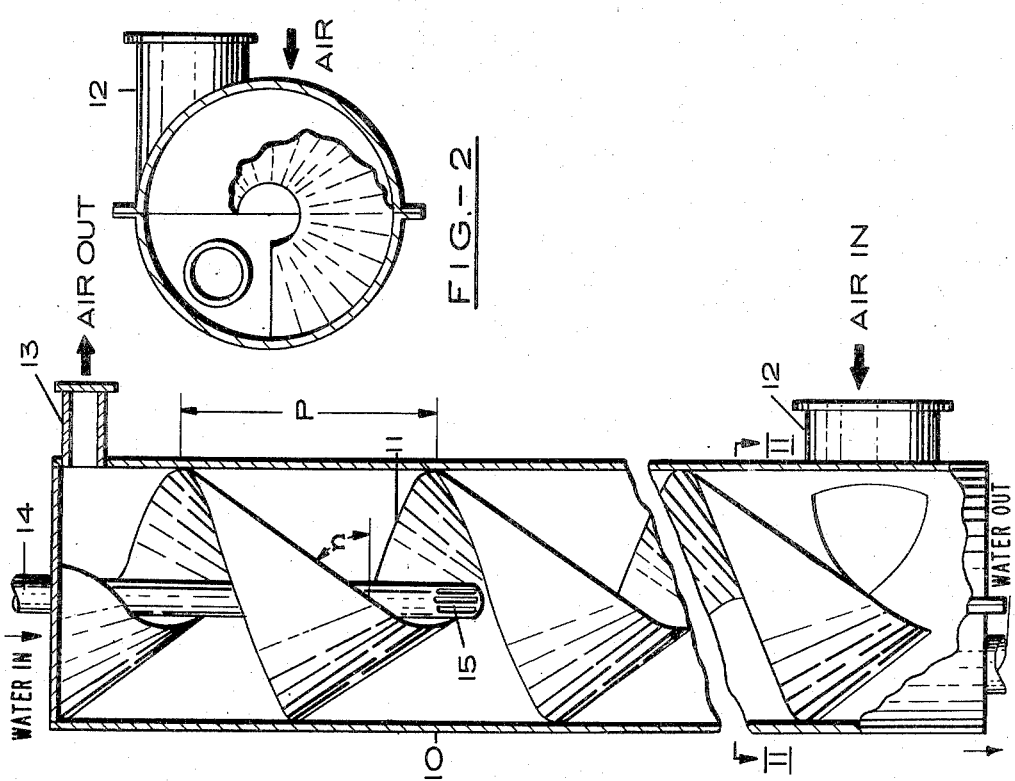

2,817,415

CONTACTING OF FLUID PHASES

Hollister B. Sykes, Roselle, N. J., assignor to Esso Research and Engineering Company, a corporation of Delaware Application September 1, 1954, Serial No. 453,550

5 Claims. (Cl. 183—115)

The present invention is concerned with the contacting of at least two fluid phases that are incompletely miscible and that possess different densities. The invention is particularly concerned with the countercurrent contacting of a liquid phase with a vapor or gas phase. The invention especially relates to an apparatus wherein a stream of vapor flowing in a helical type flow path is countercurrently contacted with a stream of liquid. The liquid is periodically and repeatedly dispersed throughout the vapor stream, collected at the outer periphery of the vapor stream and then re-introduced within the vapor stream. The invention has particular application to processes such as absorption, scrubbing, distillation, fractionation, extraction, stripping and the like.

It is well known in the chemical art to contact two incompletely miscible fluid phases that have different specific gravities for the purpose of transferring components between the phases. For example, the procedure is often employed in extraction processes where a valuable component is removed from a first fluid phase by contacting that phase with a second fluid phase that possesses a greater affinity or solvency for the given component. The procedure has also been employed in those instances where it has been desired to remove undesirable components from one fluid phase by transferring the component into a second fluid phase.

The contacting of vapors and liquids is of particular interest in the field of fractional distillation wherein a mixture of several components is separated into one or more of the individual components. This procedure is of especial interest in the petroleum industry where it is frequently necessary to fractionate a petroleum fraction having a wide boiling range into a plurality of fractions, each possessing a relatively narrow boiling range. While fractional distillation, extraction, stripping, and the other contacting processes described above have different objectives, they all utilize the same general principles that are involved in contacting a vapor phase with a liquid phase. The present invention, relating as it does to vapor-liquid contact processes in general, has application to each of the above-mentioned individual processes. The invention also has application to situations in which more than two fluid phases are involved. In the present description of the invention, however, consideration will be given for the sake of simplicity to those situations in which one liquid phase is contacted with one vapor phase.

Various types of apparatus have been employed and have been proposed for contacting two or more fluid phases. One type of apparatus that has proven to be perhaps the most popular of the various types is the so-called vertical tower type of apparatus. This form of contacting apparatus utilizes a vertically disposed cylindrical tower that is filled or provided with devices that are adapted to promote good contacting of two fluid phases. In some instances, a tower may be filled with a contacting material such as particulate solids, Raschig rings, Berl saddles, crushed wire, etc. In other instances, a tower may be provided with a plurality of superposed, vertically-spaced contacting plates such as bubble cap plates, pierced plates, perforated plates, and the like.

While the tower type of contacting apparatus has found wide acceptance and use in the chemical industry, it has long been recognized that this form of apparatus has a number of shortcomings. First, the various towers are relatively expensive and difficult to construct, operate and maintain. Second, they are limited in operation to relatively low fluid flow rates; and towers of high capacity are therefore extremely large in diameter. As a result, continuing efforts have been made and are being made to decrease the cost of tower contactors and to increase their capacity without increasing their size.

In an effort to decrease the cost and increase the capacity of tower contactors, the use of centrifugal type contactors has been suggested, but as yet, no entirely satisfactory and practicable apparatus utilizing such forces has been disclosed. It is appreciated that such contactors would possess much greater capacity per unit volume than the tower-type contactors, but the expensive nature of their construction and operation has precluded their adoption by industry.

Accordingly, it is an object of the peresent invention to provide an apparatus for the contacting of two fluid phases which is less expensive to construct, operate and maintain than the conventional forms of tower apparatus. It is a further object of the invention to provide an apparatus that has markedly greater flow rate capacity than most conventional apparatus of similar size and cost. In general, it is therefore an object of the present invention to provide an apparatus which possesses all of the more desirable characteristics of the presently available forms of apparatus. It is a particular object of the invention to provide an apparatus which is especially suited for the countercurrent contacting of a vapor phase stream with a liquid phase stream.

The present invention achieves these objectives by an apparatus which is essentially a vertically disposed, cylindrical tower that contains a continuous, helical-type baffle extending substantially the entire length or height of the tower. The baffle bears a resemblance to a "circular" staircase, except that the baffle slopes downward toward its inside edge. The baffle might therefore also be considered as a helically-shaped, banked, inclined plane that extends substantially from one end of a contacting vessel to the opposite end of the vessel.

In the present apparatus, the surface of the helical baffle has two angular dispositions relative to the vessel wall. First, the baffle has an "angle of inclination" which is imparted to it due to the fact that it is a version of an inclined plane. Second, the baffle also has a "slope angle" by virtue of the fact that it slopes inwardly (and downwardly) toward the vertical center-line of the vessel. These two angular characteristics tend to direct any liquid on the baffle surface downwardly and inwardly with respect to the vessel proper. It is preferred that the slope angle and the helix angle of inclination remain at substantially constant values and that the baffle not extend inwardly as far as the center of the vessel. Thus, it is preferred that the inside edge of the baffle form a helix having a first diameter and that the outside edge of the baffle form a helix having a second diameter which is substantially equal to the vessel diameter and greater than the diameter of the interior helix.

The vertical distance necessary for the helical baffle to advance in order to make one 360° convolution within the vessel may be referred to as the "pitch" of the baffle. The "inclination angle" of the baffle is determined by this distance and the vessel diameter.

In the present apparatus, vapor flows upward through the apparatus in a swirling path promoted by the helical baffle. The net liquid flow, on the other hand, is downward along the surface of the baffle. At sufficiently high vapor velocities, the following effects result:

(1) The liquid meets resistance in its flow along the baffle because of frictional drag, both from the surface of the baffle and from the vapor flowing in the opposite direction. The liquid, therefore, tends to run down toward the inside edge of the baffle where it drops into the vortex of the swirling vapor stream.

(2) The liquid is shredded or torn into very small droplets as it enters the swirling vapor stream; and intimate contact between the vapor and the liquid results.

(3) The swirling action of the vapor stream causes the liquid droplets to be thrown out against the vessel wall. This, of course, provides for a separation of the vapor and liquid after the contacting operation.

(4) The separated liquid runs down the vessel wall and thence down the helical baffle until the first step is repeated farther down in the vessel.

It is readily apparent then that the present invention performs all of the necessary functions for causing effective mass transfer between two fluid phases and especially between a vapor phase and a liquid phase. The invention is particularly characterized by its ability to provide a countercurrent flow relationship between the phases.

The present invention may be better understood by reference to the attached figures wherein the best mode contemplated for practising the present invention is illustrated in conjunction with the description presented hereinafter.

Figure 1 is a partially cut-away view of an apparatus embodiment of the present invention for contacting a stream of vapor with a stream of liquid.

Figure 2 is a view taken along the section II—II of Figure 1.

Figure 3 is a fragmentary perspective view of a ribbed, helical baffle member which may be utilized in the apparatus of Figure 1.

Figure 4 shows a fragmentary perspective view of a slotted, perforate, helical baffle which may also be employed in the apparatus of Figure 1.

Figure 5:
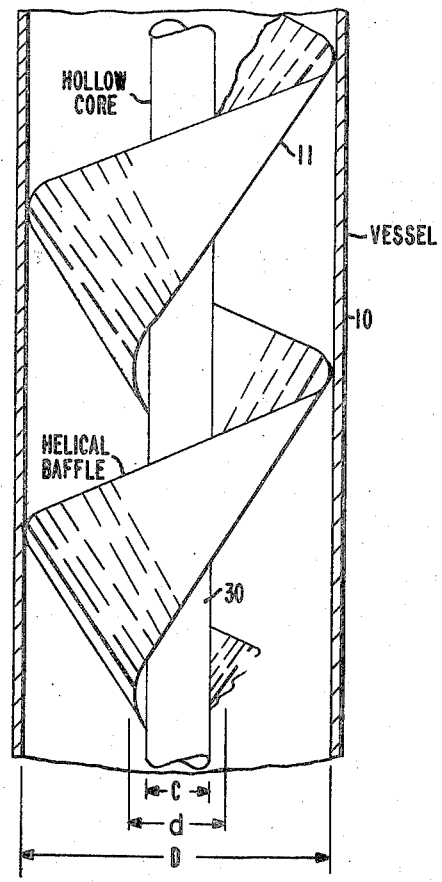
Figure 5 is a fragmentary, perspective view of a modified form of the apparatus which is illustrated in Figure 1, but which contains a hollow cylindrical core.

Referring specifically to Figure 1, it will be observed that the apparatus therein consists of a vertically disposed, cylindrical vessel 10 which is provided with a continuous helical baffle 11. The baffle extends substantially the entire length or height of vessel 10. The outer peripheral edge of baffle 11 is in continuous contact with and is sealed to the inner wall of vessel 10. The inner peripheral edge of baffle 11 is spaced laterally from the vertical center line of vessel 10.

Referring to Figure 2, in conjunction with Figure 1, it will be observed that baffle 11 has an outer effective diameter which is equal to the inner diameter of the vessel 10. This diameter will be considered hereinafter to have a value of D. Similarly, the inner edge of the helical baffle 11 will be considered to have an effective diameter of $d$. It will further be considered, as illustrated in Fig. 1, that baffle 11 has a pitch equal to P and that baffle 11 has a slope angle equal to $n$. The latter angle is the angle which the baffle makes with respect to the horizontal.

For the sake of description, it will be considered that the apparatus of Fig. 1 is operated on a stream of air and a stream of water. Air is introduced tangentially within a bottom portion of tower 10 by means of conduit 12; and it is withdrawn from a point near the top of vessel 10 by means of conduit 13.

Water is introduced within vessel 10 by means of conduit 14. Conduit 14 extends into vessel 10 substantially along the vertical center line of the vessel and laterally within the interior diameter $d$ of helical baffle 11. Conduit 14 is preferably provided with suitable perforations such as slots 15 which serve to distribute the water throughout the stream of air as the latter passes up through the vessel.

The overall dimensions of vessel 10 and baffle 11 may, of course, vary considerably depending upon the physical properties and the flow rates of the fluids contacted. It is contemplated, however, that the pitch P of the helix should have a value of from about 0.25D to 2D. It is particularly contemplated that the baffle 11 have a pitch of from 0.5D to 1.0D and especially about 0.67D.

The slope angle of the baffle 11 may have a value within the range of about 30 to 60°, and it is particularly contemplated that a value of about 45° will be most effective for the greatest number of liquid-vapor systems.

It is further contemplated that the inner diameter of the helical baffle 11 should have a value which is about 0.10 to 0.40D. It is especially contemplated that the inner diameter have a value of about 0.3D.

Air, having entered the vessel 10 by means of conduit 12, is set into a swirling motion by flowing along the inner surface of the baffle 11. The air should have a superficial flow rate based on the diameter of the vessel itself, of greater than 15 ft./sec. and preferably greater than 30 ft./sec. It is considered that extremely high air flow rates may be employed, but it is particularly contemplated that air rates should best be kept below about 100 ft./sec. Thus, an especially desirable air flow rate is considered to be in the neighborhood of about 50 ft./sec. These vapor phase flow rates may, of course, vary considerably from one vapor composition to another. It is considered, however, that vapor flow rates within the range of about 2 to 6 lbs. per sq. ft./sec. will provide a satisfactory set of operating conditions for the greatest number of vapor compositions. The proper vapor rate will, of course, also depend upon the liquid rate, which may range from about 0.5 to 10 lbs. of liquid per lb. of vapor. For fractionations, the preferred weight ratio of liquid to vapor is from about 0.75/1 to 1.50/1. For absorbers, the preferred weight ratio is from about 2.5/1 to 10/1.

As mentioned earlier, water enters vessel 10 in Fig. 1 by means of conduit 14 and slots 15. Upon passing through slots 15, the water comes in immediate contact with the swirling stream of air and is shredded into fine droplets by the air. Mass transfer between the water and the air efficiently and rapidly takes place. Immediately thereafter, the water particles, which are in substantial equilibrium with the air, are thrown laterally outward and impinge upon the inner surfaces of the vessel 10 and the baffle 11.

Due to the slope angle of the baffle 11 and also to the forces generated by gravity and the flowing air stream, water on the surfaces of the baffle and the vessel wall flows downwardly along the baffle and inwardly toward the center of the vessel. As the water reaches the inner peripheral edge of the baffle 11, it drops vertically downward once again into the upward swirling air stream. The shredding and contacting operation described above repeats itself at this point. The repeated process, however, occurs this time at a lower point within the vessel 10. Accordingly, the water stream gradually works its way downwardly through the tower, while the air stream rises upward within the tower.

The number of contacts between any given portion of the water and the air stream will be governed by the physical configuration of the apparatus as well as the operating conditions that are employed. In general, it is contemplated that each theoretical stage or plate of the present apparatus is substantially equal in height to about the pitch of the helical baffle.

While the foregoing description is contemplated to constitute the best mode of realizing the objective of the present invention, it will be understood that different details of the apparatus may be varied from one case to another. It is considered, however, that the design of any given fractionation apparatus will be governed by adherence to a number of principles. Thus, it is contemplated that the inner diameter ($d$) should be large enough to permit downflowing liquid to fall into the inner peripheral portion of the whirling vapor stream, instead of running along the baffle. On the other hand, the diameter (d) must not be so large as to permit excessive amounts of vapor to bypass up the central core. In general, it is considered that the inner diameter of the baffle should preferably vary directly as the pitch of the baffle and inversely as the slope of the baffle.

As mentioned earlier, the slope of the baffle down toward the center of the fractionation vessel governs the tendency of the downflowing liquid to run off the baffle. In the absence of any slope, the liquid would have a pronounced tendency to collect and stay along the outer edge of the baffle which is, of course, the inner surface of the vessel wall.

As suggested hereinbefore, there are two components of gravitational force which affect the flow of the liquid on the helical baffle. One component is governed by the slope of the baffle toward the vertical center line of the vessel, and the other component is governed by the helical "angle of inclination" of the baffle. The latter force is counterbalanced at least partially by the friction of the liquid flowing on the baffle and by the "drag" of the vapor stream swirling upward in the opposite direction. Thus the liquid tends to move down and around the baffle at an equilibrium velocity, V. This velocity creates a centrifugal force which tends to lead the liquid toward the perimeter of the vessel. It is this tendency which the slope of the baffle counteracts so that the liquid actually flows toward the center of the vessel.

In a case where the vapor frictional drag appears too great, it may be desirable to install ribs along the radii of the baffle and, possibly, vertically along the vessel wall. This modification would also promote liquid flow toward the center of the tower in those cases where the slope is not sufficient. Other modifications may be readily suggested by those skilled in the art without additional inventive contribution. The embodiments of the present invention that are illustrated in Figures 3–5 inclusive will indicate some of the modifications that may be made to the apparatus which is illustrated in Figure 1.

Figure 3 is a fragmentary perspective view of a helical baffle 20 and surrounding vessel 10 wherein the baffle is provided with a plurality of radially spaced ribs 22. In Figure 3, the ribs extend from the inner edge of the baffle to the outer edge of the baffle and then vertically upward along the wall of the vessel. The baffles are provided, as explained above, for reducing the drag effect of the swirling vapor stream upon the liquid stream which flows down and across the baffle. The ribs accordingly guide the fluid toward the vortex of the swirling gas stream which is in the innermost portion of the vessel.

It is apparent in Figure 3 that the ribs 22 may be provided on the baffle 20 and/or the wall of the vessel 10. In general, it is preferred that the ribs be restricted to the baffle. It is further preferred that the ribs be arcuately spaced at angles of about 45°, although angles of 30° to 60° and even 15° to 90° may be employed. The vertical height of each rib on the baffle (or the radial dimension of each rib on the inner wall surface of the vessel) should be from 0.05 to 0.3 the pitch of the baffle. It is preferred that this dimension of each rib be from 0.05 to 0.2 and particularly about 0.15 the pitch of the baffle.

Figure 4 illustrates another type of helical baffle which embodies the teaching of the present invention. In this figure, the baffle 20 is provided with a plurality of perforations in the form of radially disposed and spaced slots. The slots may extend from the inner helical edge of the baffle substantially to the outer edge of the baffle. It is preferred that the slots be spaced from the outer edge and that they be of a size, number and character to provide adequate open area to cause a major part of the liquid to flow down through them. Thus, with this particular baffle design, all of the liquid need not flow entirely into the inner edge of the baffle before it drops from the baffle into the vapor stream. Indeed, it is contemplated that the inner diameter of the baffle may be reduced substantially to zero, if the slots are sized and arranged to cause all of the liquid to drop through the slots.

In further considering the baffle of Fig. 4, it will be observed that greater contacting efficiency may be obtained by twisting the portions of the baffle that lie laterally between the slots. Furthermore, the slots of Fig. 4 and the ribs of Fig. 3 may obviously be combined.

Fig. 5 illustrates another embodiment of the present invention. The apparatus depicted therein is another modification of the vessel and baffle apparatus which is illustrated in Fig. 1. In Fig. 5 it will be observed that the vessel 10 is once again provided with an imperforate helical baffle 11.

As in Fig. 1, it will be further observed that the vessel 10 has an inner diameter D which is equal to the outer diameter of the helical baffle 11. The helical baffle once again has an inner diameter of d. In the present figure, however, the apparatus is further provided with a hollow, imperforate core member 30 of diameter c which extends substantially along the vertical center line of vessel 10. The outer surface of the core member is spaced from the inner edge of the helical baffle.

Core member 30 is provided within the apparatus of Fig. 5 to reduce bypassing of portions of the apparatus by preventing the vapor stream from passing up the center of the vessel. Such a provision is desired when the inner diameter of the helical baffle 11 for a given vessel is designed and made extra large. It is apparent that the absence of the core member would very likely result in an excessive amount of bypassing on the part of the vapor stream under such circumstances.

It will be observed that the hollow core member 30 in Fig. 5 may be readily adapted to provide a means for withdrawing liquid from the vessel 10 at any desired point. This function of the core member may be realized by extending the inner edge of the baffle 11 all the way to the outer surface of the core member at the desired point and sealing the inner edge to the core member. Under these conditions, liquid flowing down and around the baffle will tend to collect at the point where the baffle is sealed to the core member. A perforation in the core member at this point will permit the accumulated liquid to leave the vessel and enter the core member. It will be readily apparent to those skilled in the art that suitable conduit means may be provided for collecting this liquid within the core member and for then withdrawing it completely from the vessel proper.

It will be appreciated that numerous variations and modifications of the foregoing apparatus and process may be employed without departing from the spirit or scope of the invention. For example, it is contemplated that the vessel portion of the apparatus may be provided with tapering sides as well as straight sides. Furthermore, the vessel may be equipped with pumps, pressure controllers, heating means, valves, and the like as necessary in order to adapt the apparatus to any given process or situation.

It will also be recognized that the baffle within the cylindrical vessel may be provided with perforations and/or ribs other than the particular types illustrated in the figures and presented in the foregoing description. Thus, the ribs may possess a variety of cross-sectional shapes and designs. Similarly, the perforations, wherever employed, may be circular, square, rectangular, etc. in configuration. The selection of any particular type of rib or perforation may be governed to a large degree by the nature of the fluid handled as well as the operating conditions used.

The helical baffles that are illustrated in the figures which accompany the present description of the invention are depicted as baffles having entirely smooth surfaces. It will be appreciated that surfaces of this nature will not necessarily be employed or realized in the practice of the invention. Thus, the baffles may be fabricated from smooth metal sheets or they may be manufactured from metal plates that overlap one another, or that are welded together, etc. It will further be realized that the materials of construction to be employed in any given apparatus will depend largely upon the materials being processed. The selection of suitable materials of construction is, of course, well within the skill of persons associated with the various chemical processes.

It will also be realized that the vapor and liquid streams may be introduced at a variety of points with the tower design of the present invention. Furthermore, one or both of the streams may be introduced tangentially so as to follow the contour of the baffle. Again, the streams may be introduced either separately or together.

As suggested earlier, the present invention has application to a great number of chemical processes including distillations, extractions, scrubbing, stripping, etc. It is of particular interest in the petroleum industry for the fractionation of various petroleum fractions and also for the scrubbing of various gaseous hydrocarbon streams.

In order to further illustrate the present invention, the following specific example is given wherein a refinery stream is debutanized in a tower with a baffle of the same general design as illustrated in Figures 1 and 2. The tower has an inner diameter of 3 ft. and a baffle with a pitch of about 2 ft. The baffle itself has an inner diameter of 0.9 ft. and a slope angle of 45° and makes 32 revolutions within the tower. Assuming that each revolution is substantially equivalent to one stage or plate, it may be further assumed then that the tower possesses 32 stages.

The debutanizer feed, containing hydrocarbons boiling from methane through the light naphtha range (i. e. about 225° F.) and possessing an average mol. wt. of about 59.2 is introduced tangentially within the tower at a point between the 17th and 18th stage. It will be noted that the stages are numbered starting from the bottom of the tower.

The feed, 50% vaporized and at a temperature of about 215° F., is introduced at a rate of about 71,740 lbs./hr. into the tower. The tower is maintained at a pressure of about 175 p. s. i. g.

Within the tower, the vapors rise in countercurrent relation with the liquid and eventually leave the top of the tower at a rate of about 4.49 lbs./sq. ft./sec. and at a temperature of about 157° F. The total overhead, comprising a $C_1$-$C_4$ cut of 49.5 av. mol. wt. and constituting about 114,400 lbs./hr., is condensed and cooled to a temperature of about 105° F. 76,200 lbs./hr. of the condensed overhead are returned as reflux to the top of the tower; and 38,200 lbs./hr. are removed as the overhead product.

The liquid stream within the tower is withdrawn at a rate of about 153,540 lbs./hr. and a temperature of about 285° F. and is passed through a steam-heated reboiler. Vapors from the reboiler at a temperature of about 285° F. and in an amount of about 120,000 lbs. are recycled to the bottom of the tower, while about 33,540 lbs./hr. of liquid are withdrawn from the reboiler circuit as the bottoms product.

This product has an average mol. wt. of about 76.2 and is withdrawn at a temperature of about 314° F. The velocity of the recycled reboiler vapors is about 4.71 lbs./sq. ft./sec.

In connection with the foregoing example, it will be noted that a conventional bubble cap tower of about the same height and capacity as the tower of the example would require a diameter of 6 feet. In other words, the conventional tower would have to possess a cross-sectional area about 4 times that of the present tower in order to realize the same fractionating capacity. The savings resulting from the use of the present tower are therefore very substantial.

As stated hereinbefore, the present invention is not to be limited to the particular embodiments and the specific example that have been presented in this description. Thus, it may be desirable in some instances to vary the pitch of the helical baffle member of the apparatus throughout the length of the baffle. Again, it may be desirable to vary the diameters of the interior and exterior helices of the baffle. Furthermore, it may be desirable to change the slope angle of the baffle depending upon the flow conditions that exist at particular points in the apparatus.

As another contemplated alternative, it is possible to provide an apparatus of the type described hereinbefore with two concentrically disposed helical baffles and two concentrically disposed vertical shells. In such a case, the inner baffle and the inner shell are perforate; and the outer baffle and outer shell are imperforate. The outer helical edge of the inner baffle is sealed to the inner wall surface of the inner shell; and the second helical baffle is substantially concentrically disposed with respect to and surrounds the inner baffle. Further, the outer helical edge of the outer baffle is sealed to the inner wall surface of the outer shell and extends inwardly, piercing the inner shell and terminating in spaced lateral relation with the vertical center line of both shells. The inner, perforate baffle preferably extends interiorly of the inner periphery of the imperforate baffle and is spaced from or extends all the way to the center line of both shells. With this arrangement, the vapor or gas stream passes in a helical path through the inner helical shell, guided by the inner perforate baffle. The liquid, on the other hand, is periodically dispersed into the whirling vapor stream, is thrown against the inner baffle and the inner shell, passes through these two members, and then enters the annular space between the two shells and the two helical baffles. From the annular space the liquid flows downwardly by gravity and inwardly in response to the slope of the outer baffle until it re-enters the whirling vapor stream. Radially disposed and arcually spaced ribs, baffles, etc. may be provided within the annular spaces between the helical baffles and/or the shells to guide the liquid from the outer helical baffle and shell back toward the center of the apparatus. These and other variations will be readily apparent to those persons skilled in the art.

What is claimed is:

1. A method of countercurrently contacting a vapor with a liquid which comprises the steps of: providing a vertically disposed substantially cylindrical contacting zone, introducing the vapor within the lower end of said zone, advancing the vapor upward through the said zone in a swirling substantially helical flow path, said flow path having a laterally outer periphery defined by the wall of said contacting zone and a laterally inner periphery positioned intermediate the axis of the zone and the wall of the zone whereby a central vertical flow space is provided between the said axis and the said inner periphery, the stream of vapor flowing along said helical flow path having a vertical cross section whose height is defined by the pitch of said helical flow path, said pitch being in the range of from 0.25 to 2 times the diameter of said contacting zone, the upper and lower peripheries of said vertical cross section sloping downwardly and inwardly toward said axis at an angle of between 30° and 60°, introducing the liquid within the top of said contacting zone into the vortex of the swirling vapor stream, advancing the vapor stream at a velocity sufficient to shred the liquid into fine droplets and to throw the liquid laterally to the wall of the contacting zone, collecting the liquid at the wall of the zone, directing the collected liquid along the lower periphery of said vapor stream cross section to said inner periphery, moving the collected liquid downwardly through said vertical flow space and reintroducing the liquid into the vortex of the swirling vapor stream at a point below the point of prior introduction, withdrawing contacted vapor from the top of the zone and withdrawing contacted liquid from the bottom of the zone.

2. In a method of countercurrently contacting a vapor with a liquid in a vertically disposed cylindrical contacting zone wherein a helical baffle extends throughout the length of the zone with its outer periphery adjacent the wall of the zone and its inner periphery lying laterally intermediate and spaced from the axis and the wall of the zone, whereby a central vertical flow space is provided between the axis and the inner periphery, the improvement which comprises introducing the vapor in the bottom of the zone and directing it along the baffle whereby the vapor passes through the vessel in a helical flow path, maintaining the superficial velocity of the vapor at between 15 and 100 ft./sec., introducing the liquid within the top of the zone into the upwardly flowing vapor stream, whereby the liquid is shredded into fine droplets by the vapor stream and is thrown laterally to the wall of said zone, maintaining the velocity of the vapor and the slope and pitch of the baffle such that the liquid at the wall is guided along the upper surface of the baffle inwardly and downwardly back to the central vertical flow space, through which the liquid falls by gravity to reenter the upwardly flowing stream of vapor at a point spaced vertically below the prior point of entry of liquid into the vapor stream, withdrawing contacted vapor from the top of the zone and withdrawing contacted liquid from the bottom of the zone.

3. A method as defined in claim 1 in which the upper and lower peripheries of the vapor stream cross section slope downwardly and inwardly at an angle of about 45°.

4. A method as defined in claim 1 in which the pitch of the helical flow path is about 0.5 to one times the diameter of the contacting zone.

5. A method as defined in claim 2 in which the vapor rate is 2 to 6 lbs./sq. ft./sec. and the weight ratio of liquid to vapor is between 0.75/1 and 10/1.

References Cited in the file of this patent

UNITED STATES PATENTS

| 1,804,554 | Dubbs | May 12, 1931 |
| 2,585,385 | Haller | Feb. 12, 1952 |

FOREIGN PATENTS

| 299,075 | Great Britain | Oct. 22, 1928 |